United States Patent [19]

Hendricks et al.

[11] 4,257,798

[45] Mar. 24, 1981

[54] METHOD FOR INTRODUCTION OF GASES INTO MICROSPHERES

[75] Inventors: Charles D. Hendricks, Livermore; Jackson C. Koo, San Ramon; Allan Rosencwaig, Danville, all of Calif.

[73] Assignee: The United States of America as represented by the United States Department of Energy, Washington, D.C.

[21] Appl. No.: 61,166

[22] Filed: Jul. 26, 1979

[51] Int. Cl.³ ............................................. C03C 3/04
[52] U.S. Cl. ...................................... 65/21.4; 65/22; 106/40 V; 264/43
[58] Field of Search ...................... 65/21, 22; 264/43; 106/40 V

[56] References Cited

U.S. PATENT DOCUMENTS

| | | | |
|---|---|---|---|
| 3,717,486 | 2/1973 | Fukumoto et al. | 264/43 X |
| 4,017,290 | 4/1977 | Budrick et al. | 65/22 X |
| 4,133,854 | 1/1979 | Hendricks | 264/10 |

OTHER PUBLICATIONS

Laser Fusion Microspheres by Liquid-Droplet Method, Rosencwaig et al., 6/5/1978, Preprint UCRL 81421.

Primary Examiner—Robert L. Lindsay, Jr.

Attorney, Agent, or Firm—L. E. Carnahan; Roger S. Gaither; James E. Denny

[57] ABSTRACT

A method for producing small hollow glass spheres filled with a gas by introduction of the gas during formation of the hollow glass spheres. Hollow glass microspheres having a diameter up to about 500μ with both thin walls (0.5 to 4μ) and thick walls (5 to 20μ) that contain various fill gases, such as Ar, Kr, Xe, Br, DT, $H_2$, $D_2$, He, $N_2$, Ne, $CO_2$, etc. in the interior thereof, can be produced by the diffusion of the fill gas or gases into the microsphere during the formation thereof from a liquid droplet of glass-forming solution. This is accomplished by filling at least a portion of the multiple-zone drop-furnace used in producing hollow microspheres with the gas or gases of interest, and then taking advantage of the high rate of gaseous diffusion of the fill gas through the wall of the gel membrane before it transforms into a glass microsphere as it is processed in the multiple-zone furnace. Almost any gas can be introduced into the inner cavity of a glass microsphere by this method during the formation of the microsphere provided that the gas is diffused into the gel membrane or microsphere prior to its transformation into glass. The process of this invention provides a significant savings of time and related expense of filling glass microspheres with various gases. For example, the time for filling a glass microballoon with 1 atmosphere of DT is reduced from about two hours to a few seconds.

9 Claims, 2 Drawing Figures

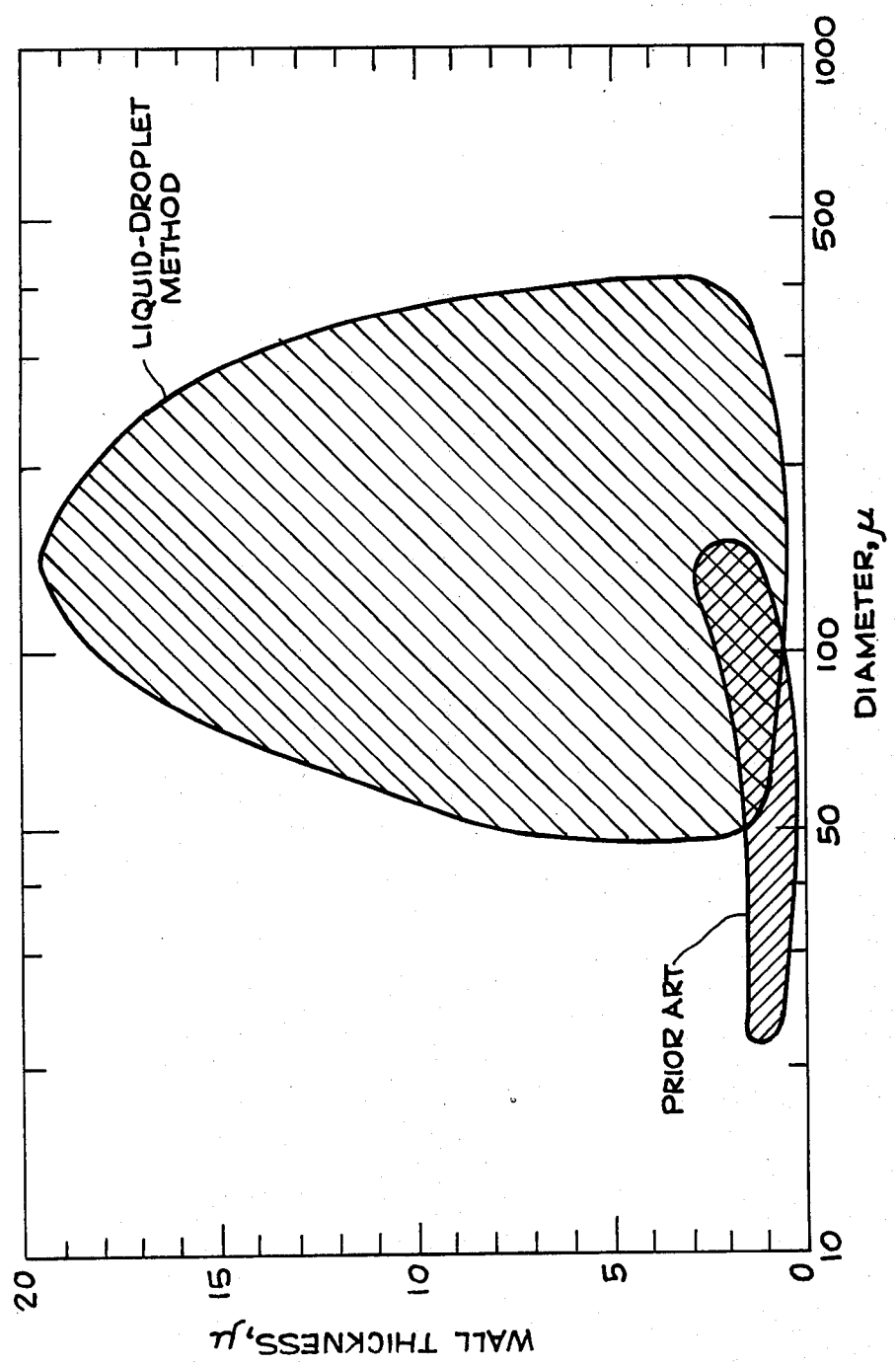

METHOD FOR INTRODUCTION OF GASES INTO MICROSPHERES

BACKGROUND OF THE INVENTION

The invention described herein arose under work at the Lawrence Livermore Laboratory in the course of, or under, Contract No. W-7405-ENG-48 between the University of California and the United States Department of Energy.

This invention relates to the production of small hollow glass spheres, particularly to a method for producing small hollow glass spheres of uniform thickness and diameter, and more particularly to a method for filling the hollow glass spheres with a gas during the formation of the hollow spheres.

The production of uniform particles or droplets has been subject of research and development efforts for over a decade, as evidenced by Review of Scientific Instruments. Vol. 39, No. 8, pp. 1088-1089, August 1968 and IEEE Transactions on Industry Application, Vol. 1A-10, No. 4, July/August 1974.

With the recent increase in development efforts in the field of inertial confinement fusion, substantial effort has been directed to methods for producing hollow spherical members for utilization in the fabrication of targets for inertial confinement systems. Such targets are used for laboratory physics studies, diagnostic evaluations, as small point sources of neutrons or x-rays, and to produce a plasma for magnetic confinement fusion systems.

The basic target for laser implosion experiments, for example, is a hollow glass microsphere having a diameter of 100 to 200$\mu$ with a wall thickness of from about 1 to 20$\mu$, and filled with up to at least 100 atmospheres of equimolar deuterium and tritium (DT). The glass microspheres are filled with the DT by a time consuming (2-50 hours) high pressure, high temperature diffusion process after the glass shell is formed. For example, to fill a glass mircosphere having a 1$\mu$ thick wall with DT of 1 atmosphere it would require a time period of at least two hours. To fill a similar microsphere with DT at 10 atmospheres, it would require a temperature of 350°-450° C., an external pressure of about 12 atmospheres, and a time period of about 24 hours. The variables involved in this prior target filling method include temperature, wall thickness of microsphere, composition of microsphere, external pressure, and desired internal pressure.

The criteria for target microspheres are very stringent. Sphericity, concentricity, and wall uniformity all must be better than 5%, a specification that requires deviations of no more than 2000 Å for a 4$\mu$ thick wall. In addition, the surface finish must be better than 2000 Å. Finally, even the thin walled microspheres must hold up to at least 100 atmospheres of DT over long periods of time.

Until recently, the glass microspheres have been obtained by laborious sorting through large quantities of commercially produced microspheres. Such microspheres were generally intended for use primarily as a structural filler in suitable resin composite materials and were mass produced from glass foils or gels blown in gas flame furnaces. As such, the microsphere were produced without concern for the above-mentioned criteria required of the glass microspheres capable of being using in inertial confinement targets, and thus only a few of those microsphere could meet that criteria.

Recently, a method and apparatus was developed which is capable of economically and efficiently producing hollow microspheres of specified mass, diameter, and wall thickness that meet the above-mentioned criteria. By this method a gel membrane is formed using a glass-forming solution having a blowing agent therein, the gel membrane is at least partially collapsed, and reformed as it transforms into glass. Such method and apparatus are described and claimed in U.S. Pat. No. 4,133,854, issued Jan. 9, 1979, and Pat. Application Ser. No. 947,665, filed Sept. 29, 1978, now U.S. Pat. No. 4,163,637, issued Aug. 7, 1979; each in the name of C. D. Hendricks and assigned to the assignee of this invention. In addition, copending U.S. Application Ser. No. 61,167, filed July 26, 1979, assigned to the same assignee, describes and claims an even more recent method for producing small hollow uniform microspheres, constituting an improvement of that in U.S. Pat. No. 4,133,854. In this later mentioned and more recent method application, the gel membrane is not totally collapsed, but remains intact (collapsed in shape) during the wall forming process. This latter method is also described in substantial detail in report UCRL-81421 by A. Rosencwaig et al, released for public distribution July 28, 1978. The inventors of this invention are also co-authors of report UCRL-81421.

Basically in the method described and claimed in U.S. Pat. No. 4,133,854, a sphere-forming material is mixed with or contains as part of the composition a blowing agent which decomposes at high temperature (~800° C.). As the temperature is quickly raised, the blowing agent decomposes and the resulting gas expands from within, thus forming a hollow sphere of controllable thickness. The furnace used is a multiple-zone type wherein each subsequent zone is at a higher temperature.

The method described and claimed in above-referenced U.S. Pat. Application Ser. no. 61,167 does not require a separate blowing agent to form the microsphere. In addition, this later method utilizes a multiple zone (or region) furnace wherein, in the preferred embodiment, the second zone is at a lower temperature than the first and the third zone is at a significantly higher temperature than the second, with a sharp temperature gradient between the second and third zones.

While the above-referenced methods and aparatus efficiently and economically produces microspheres which meet the rigid criteria mentioned above, it was still necessary to fill these microspheres with gas after the formation process. A gas such as DT is used for implosion of targets for neutrons or x-ray sources, or for producing a plasma, etc. Also, it is desirable to introduce other gases into the interior of the microspheres, such as for example, argon, kypton, xenon, bromine, etc., which are used primarily for diagnostic purposes. Other gases such as nitrogen, neon, $CO_2$, etc., could also be used. The method for filling the glass shells or microspheres with light molecule weight gases, such as DT, $H_2$, He, as pointed out above, has generally involved placing the microspheres in a container of the selected gas of high temperature (for example 400° C.) and pressure (up to and over 100 atmospheres) for a time period of at least 2 hours which is necessary for the gas to diffuse through the glass. The microspheres were retained in the container for sufficient time for the pressure on the interior of the microsphere to substantially equal that on the esterior thereof. The time required to fill a glass microsphere with DT at 10 atmospheres, for example, was about 24 hours. While a high temperature, high pressure diffusion method of filling the microsphere after the hollow microsphere or shell has been formed, may be effective for filling the shell with a light gas, such as DT, Ne and He, that method is not effective for diffusing a heavy molecule gas (molecule weight above about 20) into the hollow shells because of the low diffusion rate of the heavy molecule gases. The diffusion rate of the heavy gases is on the order of 3 to 4 orders of magnitude lower than DT. Thus, prior to this invention, for the heavy molecule gases the shell has to be tapped, filled with the desired heavy molecule gas, and then sealed, and this procedure substantially increased the time and cost of producing hollow spheres containing heavy molecule gases. Thus, a need has existed for an effective method of filling hollow microspheres with various types of gases, particularly heavy molecule gases, and noble gases, such as argon, kypton, xenon, etc.

Therefore, it is an object of this invention to provide a method for introducing a gaseous material into hollow spherical members.

A further object of the invention is to provide a method for filling hollow microspheres with selected gas or gases.

A still further object of the invention is to rovide a method for filling hollow microspheres with gases of various molecular weights during forming the hollow microspheres.

Another object of the invention is to provide a method for filling hollow glass microspheres with one or more gases by diffusing the gas or gases into a thin gel precursor or membrane, and then collapsing the precursor intact to form the glass microsphere while trapping the gas or gases therein.

Another object of the invention is to provide a method of producing gas filled glass microsheres which meet the criteria for inertial confinement tragets.

Other objects of the invention will become readily apparent to those skilled in the art from the following description and accompanying drawings.

SUMMARY OF THE INVENTION

The present invention fills the above-mentioned need to effectively and economically fill hollow microspheres with various types of gases, particularly high molecular weight gases. This invention reduces the time required to fill a glass microsphere from at least two hours to a few seconds. The method of this invention basically involves an improvement over the above-referenced microsphere forming processes, as described in the above-referenced patent, patent applications, and report UCRL-81421. This improvement consists of filling with the gas or gases of interest at least a section of the drop-furnace used in the microsphere forming process and then taking advantage of the high rate of gaseous diffusion through the thin gel membrane or precursor as it drops through the section of the furnace before the gel membrane is transformed into a glass microsphere. The critical feature is that the gas is diffused into the gel membrane and that the gel membrane does not totally collapse during the step of forming the microsphere as a substantial portion of the gas would escape from within the gel membrane if the membrane was ruptured. More specifically, the preferred method of this invention involves forming a hollow glass microsphere that is filled with a high molecular weight gas, for example, by diffusing the gas through the thin gel precursor or membrane developed during the initial formation steps of the microsphere forming process and then collapsing the precursor or membrane concentrically and uniformally without rupture to form the glass microsphere with the desired gas or gases trapped inside.

Prior to this invention, the furnaces utilized in forming the glass microspheres or shells by the above-referenced methods were normally maintained under vacuum operating conditions or at ambient atmospheric (1 atmosphere) pressure. For example, using this invention glass microspheres filled with argon gas at a pressure of 0.5 atm have been attained with the drop-furnace at atmospheric pressure. By pressurization of the furnace, high gas pressure fills can be obtained. The method of this invention can be applied for filling hollow spheres of suitable material, such as glass, with various molecular weight gases, ranging in molecular weight from 1 to 131 for hydrogen and xenon, for example. These gases are exemplified by $H_2$, $D_2$, DT, He, $N_2$, $CO_2$, Ne, and Br and noble gases such as Ar, Kr, and Xe, or mixtures thereof, although it is recognized that DT filling would create a furnace contamination problem.

The vertical drop-furnace used in carrying out the method of this invention is composed of four distinct sections: (1) the "insertion" section, (2) the "drying" section, (3) the "fusing" section, and (4) the "collector" section. The microsphere production begins with the preparation of a solution containing the ingredients for forming the hollow spheres. The solution is then fed through a droplet generator and injected into the drying section of the furnace. The furnace is provided at least in the drying section with an atmosphere of the desired gas or gases to be trapped within the microsphere during formation thereof. The processes that occur in the drop-furnace during the transformation of the starting aqueous droplet to the final gas filled glass microsphere utilizing the method of Application Ser. No. 61,167, for example, is divided into four (4) separate events: encapsulation, dehydration, transition, and refining. It is during the dehydration event in the drying section of the furnace wherein rapid diffusion into the gel membrane or microsphere of the gas in th furnace atmosphere takes place. Once the gas is inside the hollow gel membrane or microsphere it will remain there during the transformation of the gel membrane to a glass microsphere, producing a gas filled microsphere, provided the gel membrane is not allowed to totally collapse during the formation process. However, it is believed that the invention can be carried out (though not as efficiently using the forming method and furnace of above-referenced U.S. Pat. No. 4,133,854, wherein there is a near total collapse of the gel membrane during the transition event, since a small quantity of the gas may still remain trapped in the finished microsphere.

The critical feature of this invention is in the filling of the gel membrane or microsphere with the desired gas prior to its transforming into glass due to the low diffusion rate, discussed above, of the gases through glass.

This invention greatly reduces the time required, and the associated expense, in filling glass microspheres with selected gas or gases. The results achieved by this invention were unexpected and the product produced is superior, particularly with respect to the heavy molecule gases since the hollow microsphere does not have to be tapped and resealed using this method of filling.

BRIEF DESCRIPTION OF THE DRAWINGS

FIG. 2 graphically illustrates a portion of the geometric parameter spaces covered by glass microspheres produced by the drop-furnace methods compared to prior commercially produced glass microspheres.

DETAILED DESCRIPTION OF THE INVENTION

Figure 1:
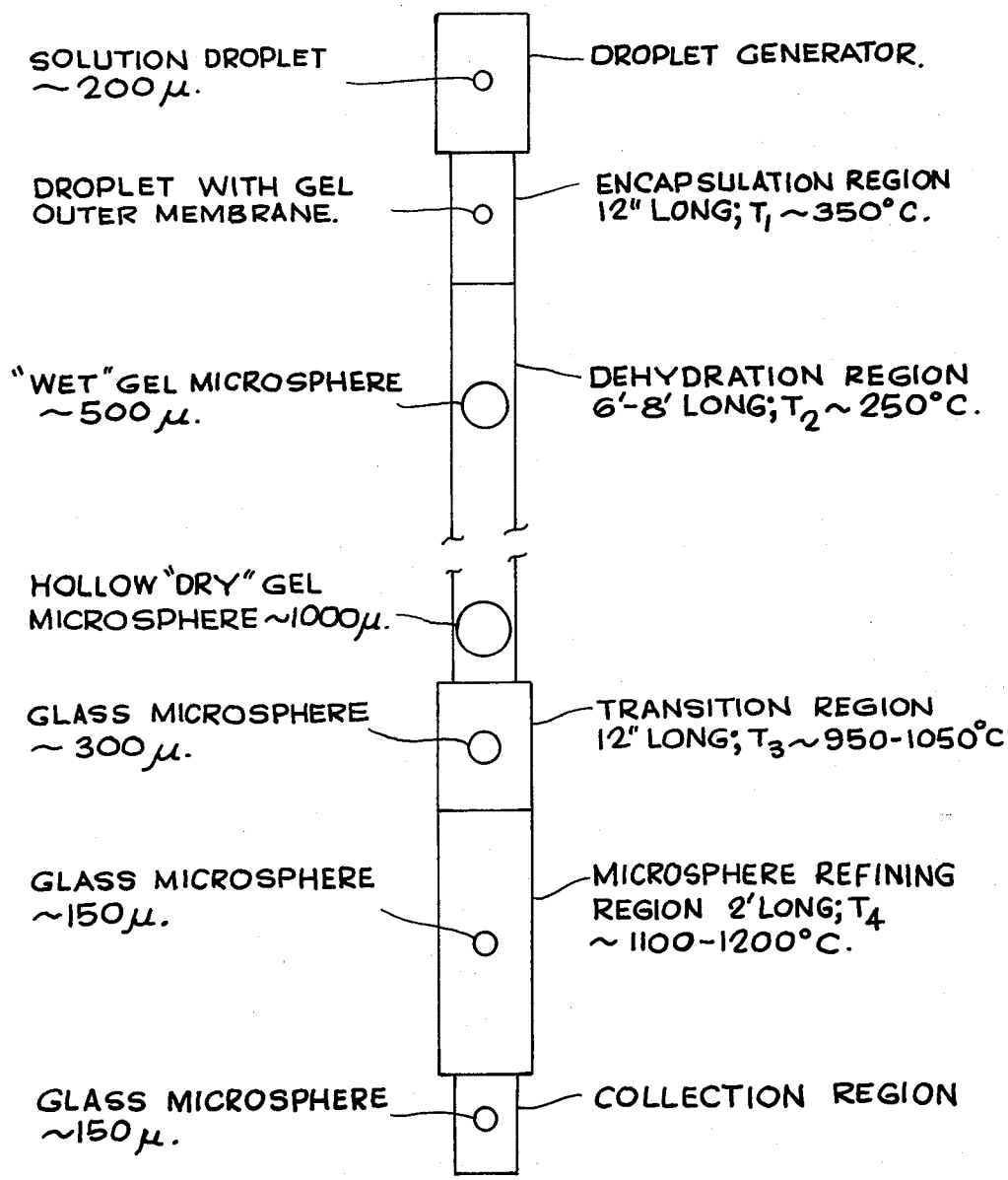
FIG. 1 is a schematic diagram of a vertical-drop furnace utilized in carrying out the invention, and a schematic representation of a formation sequence of a hollow microsphere as it passes through the furnace.

The present invention is directed to a method for producing hollow microspheres filled with one or more gases. A hollow microsphere, such as a glass shell, having a diameter from about $50\mu$ to about $500\mu$ and a wall thickness ranging from 0.5 to $20\mu$ is filled with at least one gas during the formation of the microsphere. Basically, the invention constitutes an improvement over the method for producing hollow microspheres described and claimed, for example, in above-referenced U.S. Pat. No. 4,133,854 and U.S. Pat. Application Ser. No. 61,167. This is accomplished by filling at least a section of the furnace utilized therein with an atmosphere of the desired fill gas or gases which gas or gases diffuse into the microsphere and is trapped therein during the formation thereof. The method may be utilized for filling microspheres with fill gases of various molecular weights ranging in molecular weight from about 1 to 131 for hydrogen and xenon, for example, and is particularly applicable for filling such microspheres with noble gases, such as higher molecular weight gases, exemplified by argon (Ar), krypton (Kr), and zenon (Xe). The method can also be utilized for low molecular weight gases, such as hydrogen ($H_2$), deuterium ($D_2$), deuterium-tritium (DT), as well as gases such as nitrogen ($N_2$), neon (Ne), carbon dioxide ($CO_2$), and bromine (Br), etc., which are not decomposed at the glass formation temperature or do not interact with each other or with a DT fill or the glass itself. It is of course understood that when fill gases, such as DT, are utilized, the furnace must be sealed and operated such as to prevent any contamination of the surrounding area by the tritium therein, for example.

The present invention will be primarily described utilizing the method for producing hollow glass microspheres by the liquid-droplet method of the above-mentioned U.S. Patent Application Ser. No. 61,167 which is described in substantial detail, together with test results, surface chemistry, parametric studies, etc., relating thereto, in report UCRL-81421, this report being incorporated herein by reference thereto. The present invention may utilize the microsphere production method described in the above-referenced patent, patent applications, and in said report provided that the gas is diffused into the microsphere prior to it being transformed into glass during the forming process. Thus, only those portions of those methods will be set forth herein which will enable a full understanding of the improvement provided by the present invention; namely, filling the hollow gel membrane or microspheres with selected gas or gases during the formation of the microsphere prior to the glass-forming material being transformed into glass.

The basic principles of the liquid-droplet technique for producing hollow microspheres of material, such as glass, as described in report UCRL-81421, for example, is as follows:

(a) An aqueous solution can be made containing water-soluble glass-forming compounds, such as sodium silicate.

(b) A droplet of this solution will attain a highly spherical shape in free fall due to surface tension.

(c) If the droplet is subjected to a high temperature during free fall, water vapor can be entrapped within the sphere as the glass-forming compounds transform into glass.

(d) Under the proper conditions, the entrapped water vapor will act as an internal blowing agent, creating a hollow glass microsphere.

(e) By appropriate selection of temperatures and droplet transit times, hollow glass microspheres with specified diameters and wall thicknesses can be produced in a controlled fashion.

By filling at least the drying secion of the drop-furnace through which the droplets of solution pass with a gas or gases of interest, the thus formed hollow glass microspheres are formed with the gas or gases trapped therein. This is accomplished by taking advantage of the high rate of gaseous diffusion through the thin gel membrane formed in the formation process described in greater detail hereinafter.

To accurately control the geometric parameters of the glass microspheres, for example, the aqueous droplets of a solution of glass-forming compounds or materials are introduced into a long vertical drop furnace by means of a piezoelectrically-driven droplet generator, such as described in above-referenced U.S. Pat. No. 4,133,854 and report UCRL-81421. By controlling the solution composition and the size of the orifice in the liquid-droplet generator, it is possible to control the diameter and wall thickness distributions of the resultant microspheres.

The droplet generator produces droplets with a precisely controlled volume of an aqueous solution containing glass-forming oxides. The generator of UCRL-81421, for example, consists of three basic components. The top component, the resonant stub, forms the ultrasonically stimulated jet. Below that is the charge ring which selectively charges the newly-formed liquid drops. At the bottom are the deflectors and catcher electrodes, which capture those droplets that are charged.

The resonant stub produces a jet of the glass-forming liquid by means of an orifice plate. The pressure in the manifold behind the orifice plate is varied at an ultrasonic frequency by a piezoelectric crystal. These pressure fluctuations cause the jet to have velocity fluctuations which cause the jet to break up into a stream of uniformly sized and spaced drops. The diameter of the drops exiting from the orifice plate may vary from 50 to $400\mu$, the diameter of the droplets utilized in testing efforts being $200\mu$.

To ensure clean breakup of the jet, the stimulation signal applied to the jet must be well-controlled and of high intensity. The piezoelectric crystals are driven by an oscillator locked onto the resonance frequency. This oscillator stays locked onto the resonance frequency even as the frequency changes with changes in temperature of the resonant stub. Typical operating frequencies are in the range of 10 kHz.

Located just below the orifice which forms the jet is the charge ring, a cylindrical anode placed so that the jet breakup occurs inside the cylinder. The newly-formed drops can be inductively charged as they pass through the charge ring.

Beneath the charge ring are the deflection electrodes. One electrode, the "deflector," is held at a high negative voltage, and the other, the "catcher" is at ground potential. Those droplets that are charged negative by the positive charge ring are repelled by the defector and strike the catcher where they are removed by a vacuum line. The uncharged drops pass undeflected into the drop-furnace through the orifice plate. During normal operation, only one of every 8, 16 or 32 drops is uncharged and thus most of the droplets are deflected and caught before entering the drop-furnace. This increases the spacing between the drops in the furnace, minimizing the chance of a coalescing collision.

As pointed out above, the invention as described hereinafter is carried out by the apparatus described in above-referenced report UCRL-81421. However, it is not limited to that apparatus inasmuch as at least certain, if not all, the gases exemplified herein may be diffused into the microspheres by the apparatus, for example, illustrated in U.S. Pat. No. 4,133,854. But, due to the near total collapse and reformation of the microsphere in the transition stage of the process of U.S. Pat. No. 4,133,854, this process is not as effective as that described in report UCRL-81421, particularly for the high molecular weight gases.

FIG. 1 schematically illustrates an embodiment of a vertical drop-furnace or oven, for example, which may be utilized in carrying out the present invention. The droplet generator, such as illustrated in report UCRL-81421, is mounted at the top of the furnace. Also, FIG. 1 illustrates the microsphere formation as a drop of glass forming solution passes through the droplet generator and the furnace. Note that the gel membrane is merely reduced in diameter (about ½) and does not totally collapse (collapsed in shape). The furnace, for example, consists of segments of quartz tubes (3" in diameter, ⅛" thick), joined together to form a total length of up to 16 feet. The heating elements consist of insulated heater strips and clam-shell multi-zone furnaces.

The vertical drip furnace or oven of FIG. 1 can be considered to be composed of four distinct sections. The top-most section is the "insertion" section, where the droplet-generator is situated. Below that is the "drying" section, 6–10 feet long and maintained at temperatures of 200–400° C. The next section is the "fusing" section, 3 feet long, and maintained at temperatures of 1100–1500° C. Finally the bottom 3 feet comprise the "collector" section. Here the hollow glass microspheres drop into a suitable container, and the furnace gases are drawn out in a controlled fashion through a vent.

The various heaters in the drop furnace are driven by appropriate thermocouple-controlled power supplies. The furnace is well sealed and insulated throughout the heated regions. The amount of air drawn into the furnace is carefully controlled by means of the vacuum vent in the collector section, as in above-referenced U.S. Pat. No. 4,133,854. The lengths of the various sections have been established from an investigation of the necessary transit times that the droplet must spend during the various stages of transformation into a hollow glass microsphere. It has been estimated that vertical velocities of the droplet may range from $\sim$500 cm/sec near the top to as low as $\sim$5 cm/sec at the bottom of the drying region, averaging $\sim$100 cm/sec. Transit time ranges from 1–20 secs. (4–6 sec. average).

Since the creation of a hollow glass microsphere from a liquid droplet is a dynamic process occurring in a reasonably short time, and since the droplet is traveling through a long opaque furnace, direct observation studies of the processes that occur cannot be conducted. However, through extensive experimentation, the physical and chemical processes that take place in the liquid-droplet technique illustrated in FIG. 1 have been determined, and described in substantial detail in above-cited report UCRL-81421.

Basically, the gas filled microsphere production may begin with the preparation of a glass-forming solution such as that containing as its main ingredients water and hydrated sodium silicate, and lesser amounts of boric acid, potassium hydroxide and lithium hydroxide. The solution is then fed through the droplet generator and injected into the drying section of the furnace or oven which is at least partially filled with the gas or gases to be contained in the formed microsphere.

The processes, as described in report UCRL-81421 and as illustrated in FIG. 1 that occur during the transformation of the starting aqueous droplet to the final hollow glass microsphere, can be divided into four (4) separate events or phases. These events or phases are encapsulation, dehydration, transition, and refining, each being described under separate headings hereinafter.

(a) Encapsulation

The drying section of the exemplified gas filled drop-furnace is divided into two distinct temperature zones. In the first zone, (the encapsulation zone) the temperature is set at 300–400° C. This zone is generally only about 1–2 feet long. The second zone (the dehydration zone) is 4 to 8 feet long with the temperature set at 200–300° C.

As a 200 $\mu$ diameter solution droplet, for example, enters the first zone, a rapid vaporization of water occurs from outer surface. When the outer surface loses a sufficient amount of water, a skin, or gel membrane forms. This gel membrane encapsulates the rest of the solution droplet in an elastic outer surface. As in all of the furnace sections, the temperature here must be carefully selected. Is is important to achieve rapid encapsulation and, subsequently, rapid dehydration in order to ensure proper operation within a reasonable drop length. However, if the temperature is too high in either the first or second zones, the gel encapsulated droplet will explode to excessive water vapor pressure, and glass microspheres of the proper size will not be produced. If the temperature in the first zone is too low, encapsulation will result too far down the drying section, and the gel membrane will not be sufficiently dehydrated for proper fusing into glass. It has been determined that temperatures of about 300—400° C. in the first one to two feet of the drop furnace will ensure rapid encapsulation without explosion.

(b) Dehydration

Once the droplet is encapsulated, the water vapor entrapped within diffuses rapidly through the thin gel membrane and there is equally rapid diffusion into the gel membrane of the fill gas or gases in the furnace atmosphere not present in the membrane. The diffusion process inward is driven by concentration gradients. The rate of water vapor production within the gel membrane is determined primarily by the temperature in the second zone of the drying region. It has been determined that temperatures of 200–300° C. ensure rapid deydration of the gel membrane, while preventing rupture of the membrane due to excess water vapor pressure. Since the gel membrane is very thin (~2000 Å), and very weak at these temperatures, the rate of diffusion of vapor through the membrane must closely equal the rate of vapor production within, so that only a few tenths of an atmosphere pressure are allowed to build up within the gel membrane unless the oven is pressurized.

As the water vapor diffuses out of the gel membrane, more of the glass-forming material, primarily sodium silicate, goes out of solution and is incorporate into the gel membrane. Under the action of the water vapor pressure within, the augmented membrane will increase its surface area and thus the gel membrane will grow in size and become hollow within. Once the gas or gases, is inside the hollow gel membrane it will remain there during the transformation of the membrane into glass. If the transit time in the second zone of the drying region is long enough, the gel membrane emerging out of the drying region will be a large spherical hollow microsphere with an outer skin thickness of about 1000 Å thick. These gel membranes have been observed to be as large as 2 mm in diameter.

At the end of the dehydration region, the wall of the gel membrane is quite hard and is not readily deformable. Thus even though there is now little or no excess pressure within, the gel membrane will not collapse on its own. Also, significant amounts of the gas, up to 0.5 atmosphere of argon, for example, have been introduced into formed hollow glass microsphere, during the above operation, wherein the oven contained argon at about one atmosphere.

(c) Transition

Upon leaving the dehydration region, the gel membrane enters the transition region, which is 6–12" long and is kept at 110°–1500° C. Note the sharp increase in temperature from 300° C. in the encapuslation region. The time in the transition region is the most crucial period in the liquid-droplet process for it si here that the transformation to glass occurs. As the transformation begins, the gel wall or skin turns to liquid, its viscosity drops, and the gas filled membrane begins to collapse in shape due to surface tension since there is little to no excess pressure within. There may be some additional diffusion of gas or gases from th furnace into the microsphere during this phase of the process, particularly the lighter molecular weight gases, such as $H_2$, He, or DT. The collapse is partly offset by a build-up of some excess internal pressure dur to a decreasing inner volume, and to the release of new water vapor and possibly other gases during the glass formation process. Thus, the collapse is only partial so as to retain the gas therein.

It has been found that high-quality concentric glass microspheres can be obtained if the partial collapse from the gel membrane state is properly controlled. In praticular, it has been determined that the glass formation chemcial reaction should occur fairly rapidly, thus ensuring that the gel membrane will partially collapse uniformly while remaining hollow and sphereical. On the other hand, one does not want the reaction to occur so fast that total collapse occurs before all parts of the gel wall turn to glass. A total collapse would result in loss of at least part of the gas in the microsphere. The two parameters that need to be controlled are the average temperature of the transition region and the transit rate through the transition region. If these two parameters are properly controlled, the hollow gel membranes that enter the transition region emerge from this region as hollow glass microspheres, about ⅓ the size of the original gel membranes.

(d) Refining

Below the transition region is the refining region. This is a region kept at 1200° C. that is 1–3 feet long. In this region, the glass microspheres produced in the transition region undergo no major alterations, but rather more subtle refining process. There may also be some diffusion of selected gases into the microspheres during this phase, but diffusion would be relatively little compared to that in the dehydration phase. Here the chemical reaction comes to completion and any pockets of incompletely reacted material within the wall now turn to glass and the wall becomes homogeneous. Any small gas bubbles trapped within the walls will tend to diffuse out and disappear.

There is some change in geometric parameters as the microsphere transverses this region. The glass forming gases and vapors trapped within the microsphere diffuse out at a rate determined by the glass composition and the temperature, and the microsphere becomes somewhat smaller. A small amount of the gas or gases diffused into the hollow microsphere may also diffuse out. Simultaneously, if the viscosity of the glass is low enough, any defects in sphericity will be eliminated by the surface tension of the molten glass.

It has been determined that, by controlling both the temperature and transit time through the transition and refining regions, one can obtain fairly high yields of gas filled, glass microspheres with the desired geometric parameters and with excellent sphericity and concentricity.

While the gel membrane is traversing the relatively low temperatures of the drying region, it is reasonable to assume that only the water vapor escapes from the falling droplet. In the fusing region, however, a certain amount of vaporization of the alkali constituents Na (B.P. 883° C.) and K (B.P. 774° C.) can be expected. Because of the down-draft in the furnace or oven, created by the vacuum vent in the collector region, the hot alkali vapors will tend to recondense on the cool glass microspheres in the collector region. The presence of reactive alkali condensate on the surface of newly formed microspheres can be disastrous. The reactive alkali quickly forms NaOH or KOH in air which rapidly etches the soft-borosilicate glass walls. To prevent this problem, the amount of reactive alkali vapor in the oven atmosphere is reduced by controlling the number of droplets present in the oven at any instant, and by controlling the atmosphere in the oven.

Even when care has been taken to minimize the presence of alkali condensate on the freshly made gas filled microspheres, one must take additional steps to ensure the viability of these soft borosilicate microspheres both in the short term and in the long term, and a brief outline of the pertinent steps is as follows:

Immediately after collection, the gas filled glass microspheres are immersed in Freon to minimize contact with the atmosphere. As soon as possible thereafter, they are washed in a hot $HNO_3$ + $NH_4F$ etch. This removes all reactive alkali and alkaline compounds from the surfaces. This treatment has been shown effective in preventing noticeable surface deterioration for at least several weeks. For longer viability, the microspheres are either treated with appropriate glass passivating agents such as a silane, or stored in a closed alcohol or Freon environment.

Above referenced UCRL-81421 illustrates comparisons of the surfaces of microspheres produced as above described with those produced by prior known processes.

Gas filled microspheres of various diameters and wall thicknesses can be produced by the above described method. FIG. 2 graphically illustrates this capability of the liquid-droplet process compared to the previously known commercial produced microspheres. It is readily seen that microspheres made by the above-described process have diameters from about $50\mu$ to about $500\mu$ and wall thickness from about $0.5\mu$ to about $20\mu$, thus providing a wide range of both wall thickness and size. For example, microspheres having a $140\mu$ diameter have been produced with thin walls (0.5 to $4\mu$) and with thick walls (5 to $20\mu$). Also, for example, larger diameter microspheres having inner diameters of $350\mu$ and wall thicknesses of 1.5 to $6\mu$ have been produced from the same size droplets as the $140\mu$ microspheres (glass mass $\sim 3$ $\mu$gm), by reducing the temperature in the refining region of the furnace to 1200° C. To produce hollow microspheres larger than about $500\mu$ diameter, generators of larger droplets and liquid-droplet furnaces capable of handling glass masses greater than 3 $\mu$gm per droplet are required.

The present invention, while constituting an improvement over the method described and claimed in the above-cited U.S. Pat. No. 4,133,854 and in the above-referenced U.S. Pat. application Ser. No. 61,167 provides a significant advance in the fabrication of gas filled microspheres, such as utilized in inertial confinement targets. By filling the hollow microsphere with a desired gas during the formation of the microsphere, the time and expense of producing such gas filled microspheres is significantly reduced. This invention provides a relatively simple method of filling microspheres with either low or high molecular weight gases. It is particularly applicable to higher molecular weight noble gases, such as Ar, Kr, and Xe, which do not readily diffuse into a glass shell, for example, by high temperature, high pressure diffusion processes after the glass shell is formed or after the transition of the shell forming solution into glass. While low molecular weight gases, such as He, $H_2$, $D_2$ and DT, can be diffused into the glass shell after formation, the method of this invention eliminates the additional diffusing operation and the associated time and expense. Also, gases such as $N_2$, $CO_2$, Ne, Br and other gases as described above can be diffused into the glass microspheres by this method. As pointed out above, to produce a gas pressure higher than about 0.5 to 1 atmosphere within the hollow microsphere made in accordance with the present invention, the furnace atmosphere need merely be pressurized and controlled to a pressure twice to three times the desired pressure of the gas in the microsphere, in the range of less than 1 atm. to many atmospheres in a manner well known in the art.

It is thus seen that the present invention provides a method for producing gas filled microspheres by filling the microspheres with the desired gas during the formation of the hollow microsphere. This is done by filling at least a portion of the furnace used in hollow microsphere production with a controlled atmosphere of the desired gas or gases to be trapped within the microsphere, and then taking advantage of the high rate of gaseous diffusion of the fill gas through the thin gel membrane in the dehydration phase of the microsphere fabrication.

Tests, which involve breaking the gas filled microsphere produced as described above, and measuring the liberated gases with a mass spectrometer have clearly verified the above-described method of this invention. It appears that almost any gas can be introduced into the inner cavity of the glass microspheres fabricated in the manner of this invention.

While particular embodiments, materials, and parameters have been set forth to describe the invention, modifications will become apparent to those skilled in the art, and it is intended to cover in the appended claims also such modifications as come within the spirit and scope of this invention.

We claim:

1. A method of filling a hollow glass microsphere with at least one gaseous material during formation of the microsphere comprising the steps of:

forming a thin hollow gel membrane from a solution of glass forming material;

filling an environment around the gel membrane with a gaseous material capable of diffusing into the membrane and selected from the group consisting of Ar, Kr, Xe, $N_2$, $CO_2$, Br, Ne, He, $H_2$, $D_2$, Dt and combinations thereof, so that the gaseous material diffuses into the thin hollow gel membrane during forming thereof; and rapidly collapsing the gel membrane to form a hollow glass microsphere trapping the gaseous material in the microsphere.

2. The method defined in claim 1, wherein the gaseous material trapped within the hollow microsphere during the step of collapsing the gel membrane is a noble gas.

3. The method defined in claim 1, wherein during the step of filling the environment the gaseous material is under a pressure of at least one standard atmosphere.

4. The method defined in claim 1, wherein during the step of collapsing the gel membrane the membrane is uniformly collapsed in shape and without rupture to form the hollow glass microsphere.

5. In the method for producing small hollow glass spheres of uniform wall thickness and diameter by forming drops from a solution of selected materials comprised of at least a glass forming material, passing the drops through a multiple zone furnace having differing temperatures in each zone for forming hollow gel membranes, drying the membranes, and collapsing the membranes into hollow spheres; the improvement comprising:

providing the furnace with an atmosphere of at least one fill gas capable of diffusion into the membrane and selected from the group consisting of Ar, Kr, Xe, $N_2$, $CO_2$, Br, Ne, He, $H_2$, $D_2$, DT and combination thereof, and controlling the temperatures in the multiple zone furnace such that the fill gas diffuses into an interior of the hollow gel membranes during formation of the hollow spheres, producing gas filled hollow spheres.

6. The method defined in claim 5, additionally including a step of:

controlling pressure of the fill gas provided in the furnace such that the pressure of the gas contained within the hollow spheres is controlled.

7. The method defined in claim 5, wherein during the step of providing the furnace with a fill gas, the fill gas is comprised of at least one gas which is not decomposed at glass formation temperature and does not interact with the DT fill gas, the glass forming material, or other fill gas.

8. The method defined in claim 5, wherein during the step of providing the furnace with a fill gas, the fill gas is a noble gas.

9. The method defined in claim 8, wherein the noble gas is argon and the hollow spheres contain argon at a pressure of about 0.5 atmospheres.

* * * * *